W. J. HISS.
CONDUIT OR CABLE CLAMP AND BRIDLE RING.
APPLICATION FILED OCT. 2, 1920.
1,381,192.
Patented June 14, 1921.
3 SHEETS—SHEET 1.
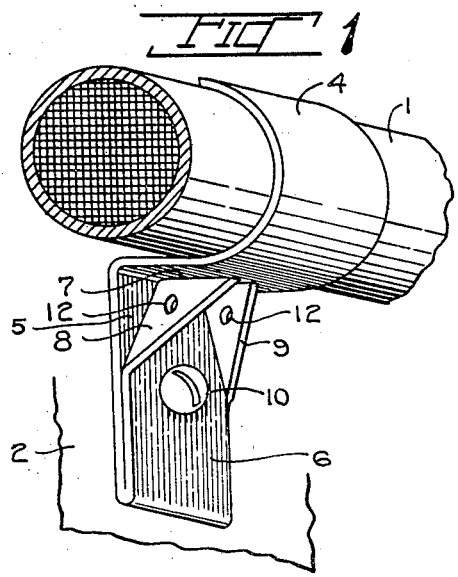
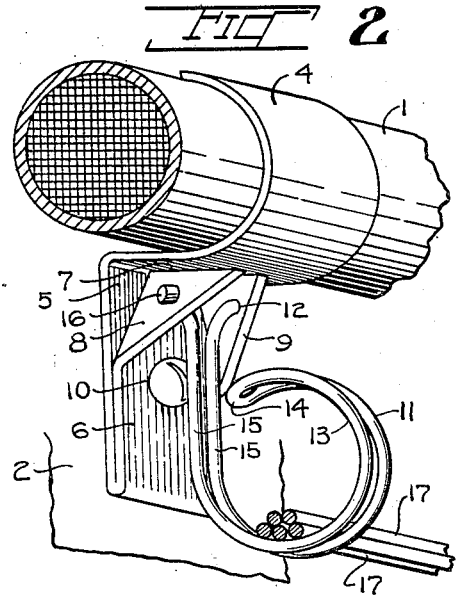
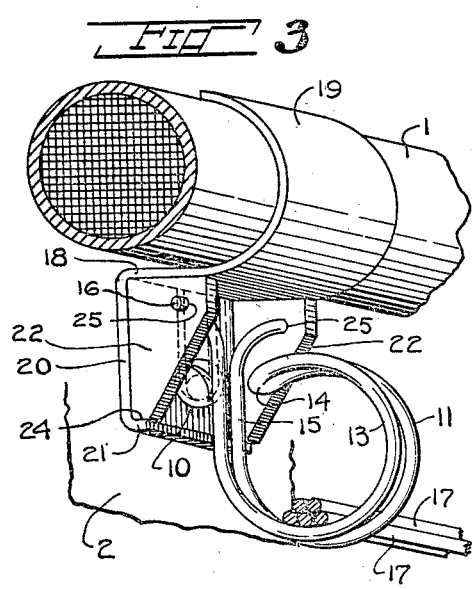
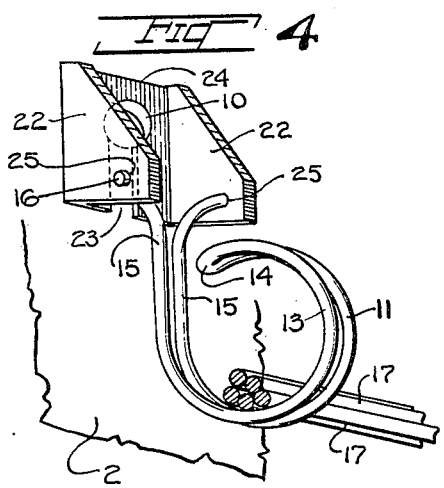
INVENTOR
William J. Hiss
BY
Alan M. Johnson
ATTORNEY W. J. HISS.
CONDUIT OR CABLE CLAMP AND BRIDLE RING.
APPLICATION FILED OCT. 2, 1920.
1,381,192.
Patented June 14, 1921.
3 SHEETS—SHEET 2.
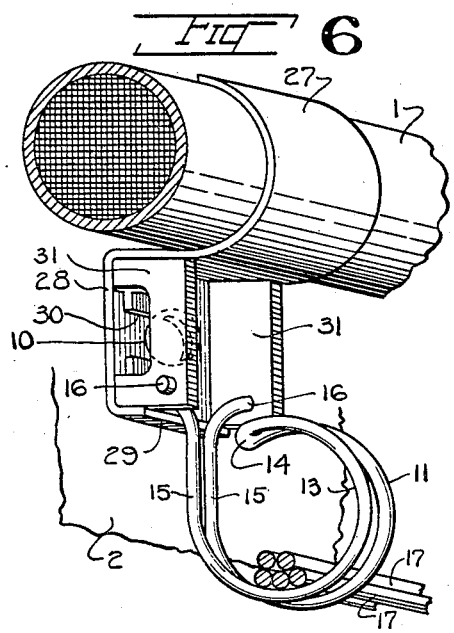
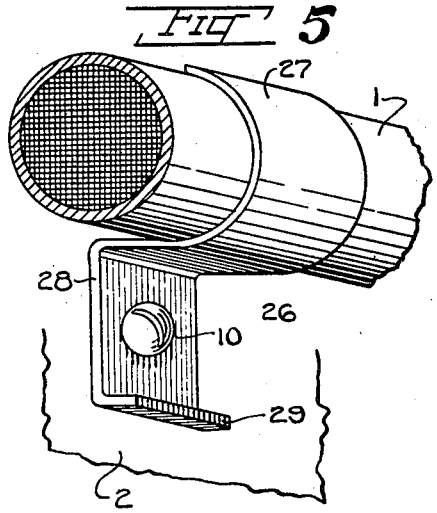
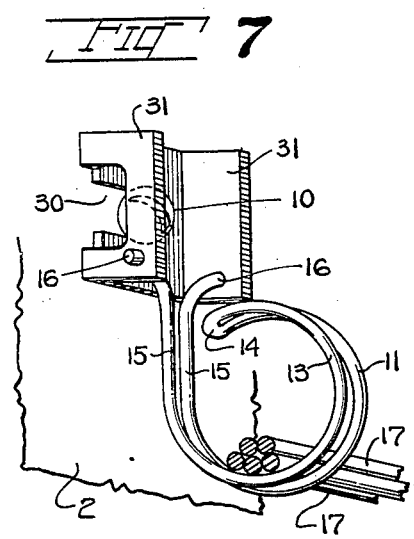
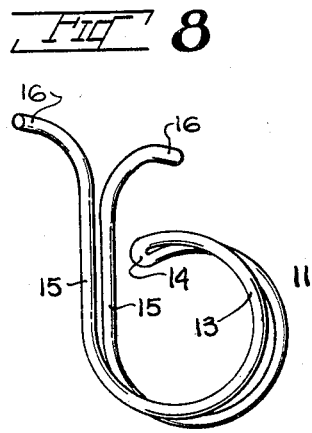
INVENTOR
William J Hiss
BY Alan M Johnson
ATTORNEY W. J. HISS.
CONDUIT OR CABLE CLAMP AND BRIDLE RING.
APPLICATION FILED OCT. 2, 1920.
1,381,192.
Patented June 14, 1921.
3 SHEETS—SHEET 3.
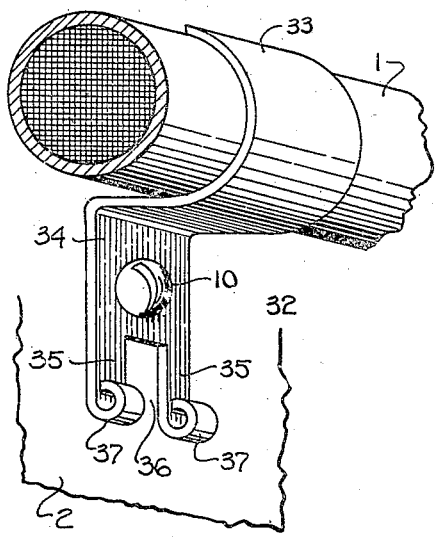
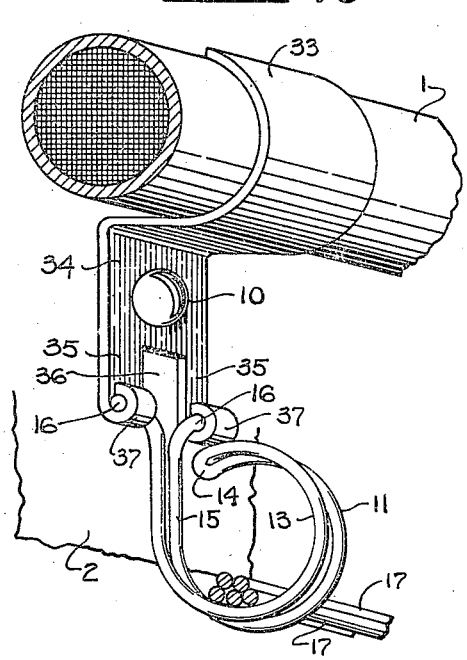
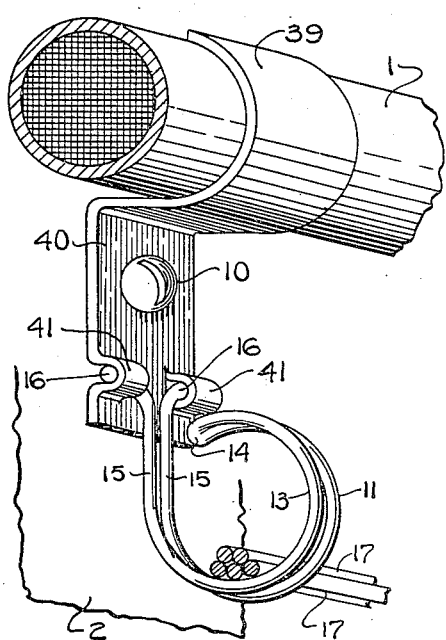
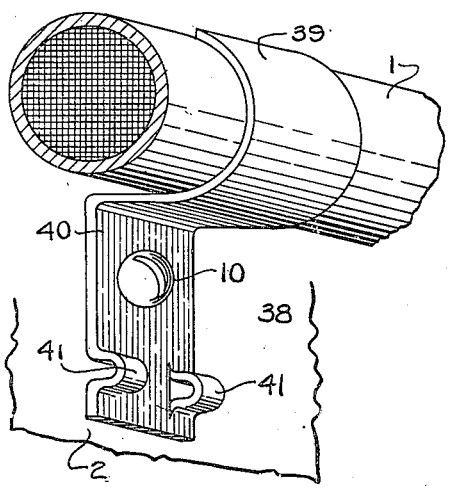
INVENTOR
William J. Hiss
BY
ATTORNEY

UNITED STATES PATENT OFFICE.

WILLIAM J. HISS, OF NEW YORK, N. Y., ASSIGNOR TO DIAMOND EXPANSION BOLT COMPANY, OF NEW YORK, N. Y., A CORPORATION OF NEW YORK.

CONDUIT OR CABLE CLAMP AND BRIDLE-RING.

1,381,192.  Specification of Letters Patent.  Patented June 14, 1921.

Application filed October 2, 1920. Serial No. 414,188.

*To all whom it may concern:*

Be it known that I, WILLIAM J. HISS, a citizen of the United States, residing in the borough of Manhattan, county, city, and State of New York, have invented certain new and useful Improvements in Conduit or Cable Clamps and Bridle-Rings, of which the following is a specification, taken in connection with the accompanying drawings.

My invention relates to the combination of a conduit or cable clamp and an open bridle ring, and also to the open bridle ring as a sub-combination or article of manufacture.

My invention further relates to an open bridle ring preferably, though not necessarily, formed of wire bent back on itself to form an open ring having one end unsupported, the ends of the wire being brought adjacent to each other to form a bifurcated spring shank. The two free ends of the wire are bent at an angle to the shank to coöperate either directly with the conduit or cable clamp, or with a member carried by, or supported on, said clamp.

In the figures, in which I have shown several embodiments of my invention, the same reference numerals refer to similar parts in the several figures.

Figure 1 is a perspective view of one form of conduit or cable clamp;

Fig. 2 is a perspective view, similar to Fig. 1, showing the bridle ring mounted on the conduit or cable clamp;

Fig. 3 is a perspective view of a different form of conduit or cable clamp in which a carriage or supporting member is held to the conduit or cable clamp, the bridle ring being supported by the carriage;

Fig. 4 is a perspective view of a modified construction in which the carriage of Fig. 3 is reversed and used to support the bridle ring on a wall or other suitable support independent of a conduit or cable clamp;

Fig. 5 is a perspective view of another form of conduit or cable clamp;

Fig. 6 is a perspective view of the conduit or cable clamp shown in Fig. 5, with the addition of a different form of supporting member or carriage and the open bridle ring;

Fig. 7 is a perspective view of the supporting member or carriage shown in Fig. 6 used alone to support the bridle ring upon a wall or other suitable support;

Fig. 8 is a perspective view of the preferred form of open bridle ring having a bifurcated shank;

Fig. 9 is a perspective view of a different form of conduit or cable clamp;

Fig. 10 is a perspective view of the conduit or cable clamp shown in Fig. 9 with the addition of the bridle ring;

Fig. 11 is a perspective view of a different form of conduit or cable clamp in which bearings are stamped up from the base;

Fig. 12 is a perspective view of the same conduit or cable clamp as shown in Fig. 11, but with the addition of the bridle ring.

In the commercial use of conduit or cable clamps it is not generally possible, at the date of the original installation, to determine whether or not bridle rings will be needed to support additional loose strands of bridle wires. In commercial practice, a cable is supported on a wall or other suitable support and it may be weeks, months, or years later that the telephone engineers will determine that it is desirable to support bridle wires parallel to the cable.

By my invention the conduit or cable clamp may be used as a separate article of manufacture or sub-combination, and then later, when the needs of the service demands it, my bridle ring may be supported by the same conduit or cable clamp, when the complete combination would be used.

In my invention I have shown several different forms of conduit or cable clamps all coöperating with my open bridle ring to form complete combinations.

In Figs. 1 to 2, for example, the cable 1 is supported on the wall or other suitable support 2, by the conduit or cable clamp 3 having a hook portion 4, the base 5, and the reinforcing member 6. This reinforcing member is preferably formed integral with the base 5 and bent back upon it as shown in Figs. 1 and 2. The end 7 of the reinforcing member 6 is bent at an angle to form two wings 8 and 9, which bear upon the lower surface of the hook portion 4, and serve as a support for the same. The screw 10 secures the conduit or cable clamp upon the wall or other suitable support 2.

I provide the wings 8 and 9 with any suitable means to coöperate and hold the bridle ring 11. Preferably these coöperating means are the holes 12, 12 which are stamped or otherwise formed in the wings 8 and 9.

When the cable 1 is originally installed simply the cable clamp 3 would be used, as shown in Fig. 1. Weeks, months or years later when the traffic load becomes excessive, and the telephone engineers desire to increase the capacity without going to the expense of mounting a larger cable, it is merely necessary, by my invention, to secure the open bridle ring 11 to the wings 8 and 9.

This bridle ring may be formed in various ways. Preferably, though not necessarily, I form it from wire bent back on itself to form an open ring 13 having an unsupported end 14, the two strands of the wire 15, 15 being brought adjacent to each other to form a spring shank; the very ends 16, 16 are bent away from each other to form a bifurcated shank and engaging arms to coöperate with suitable engaging surfaces carried by the conduit or cable clamp, or by a supporting member or carriage held thereto.

In the construction shown in Figs. 1 and 2 it is merely necessary to hook one of the arms 16 in one of the holes 12, 12 and then by manipulation compress the strands 15, 15 together so as to permit the other arm 16 to spring into the other hole 12, when the open bridle ring 11 will be securely held to the conduit or cable clamp 3. The runs of bridle wires 17, 17 can then be threaded through the open ring 13 in the usual manner.

Should it ever be desirable to remove these bridle wires 17 and the bridle ring 11, this may be easily done by compressing the spring shank sufficiently to withdraw one of the arms 16 from its coöperating hole when the other arm can be then readily withdrawn. The bridle ring may be used again in any other location with a cable or conduit clamp or carriage adapted to coöperate with it.

In Figs. 3 and 4 I have shown a conduit or cable clamp 18 having a hook portion 19, and a base 20, both of one thickness of metal. The base 20 is preferably provided with a lip or flange 21 to coöperate with a supporting member or carriage 22.

Ordinarily the cable 1 will be supported by the conduit or cable clamp 18 without the addition of the bridle ring 11. Whenever it is desirable to increase the capacity of the installation, it is merely necessary, in this form of my invention, to loosen the securing screw 10 slightly, so as to permit the supporting member or carriage to be slipped under the head of the screw 10, the screw passing through the slot 23. By then tightening up the screw 10, the end 24 of the carriage is brought back of the lip or flange 21 and serves to securely hold the supporting member or carriage to the conduit or cable clamp. This supporting member or carriage 22 is provided with any suitable coöperating means to support the bridle ring 11. Preferably it is provided with the holes 25, 25 for this purpose. After the carriage has been secured in position and the head of the screw 10 tightened, the arms 16, 16 can be sprung into the hole 25, 25 in the same manner as previously described in connection with the forms shown in Figs. 1 and 2.

In some cases I may desire to support the bridle ring 11 without using a conduit or cable clamp. I have shown one such form of my invention, but to which I am not to be limited, in Fig. 4, where the removable or supporting carriage 22 is shown in reverse position, and secured to the wall or other suitable support 2, by the screw 10. Of course, the carriage could be arranged with the slot 23, as shown in Fig. 3. When the carriage is used alone, however, it is preferably reversed as shown in Fig. 4, so that the screw 10 will become seated in the upper closed portion of the slot.

In some cases I may use a conduit or cable clamp 26, Figs. 5 and 6, having a hook portion 27 and a base 28, both of one thickness of metal. Preferably, though not necessarily, I provide the lower end of the base 28 with a flange 29 as shown in Fig. 5. In this form of my invention, when it is desired to support runs of bridle wires 17, the head of the securing screw 10 is loosened slightly to permit the horizontal slot 30 in the removable supporting member or carriage 31 to slip horizontally under the head 10 of the securing screw. The head of the screw 10 is then tightened which will hold the carriage or supporting member 31 firmly to the conduit or cable clamp 26. The open bridle ring 11 is then secured to the carriage 31 by simple manipulation in the manner previously described.

In some cases where it is desired to support the open bridle ring 11 to a wall or other suitable support 2 without the aid of a conduit or cable clamp, it is merely necessary to screw the screw 10 through the slot 30, Fig. 7 and then, or previously, attach the bridle ring to the carriage or support 31.

I may form my conduit or cable clamp 32, Fig. 9 with a hook portion 33, and a base 34, both of one thickness of metal. The lower portion of the base is provided with two tines 35, 35 and an interposed slot 36. The ends of these tines are bent back upon themselves, forming bearings 37, 37 for the arms 16, 16 of the bridle ring 11, as shown in Fig. 10.

Instead of forming the base with two tines I may employ a conduit or cable clamp 38, Fig. 11, having a hook portion 39, and a base 40, from which is struck up two bearings 41, 41. The arms 16, 16 of the bridle ring 11 fit in these bearings. A portion of the shank of the bridle ring rests upon the lower portion of the base 40, Fig. 12.

In all forms of my invention it is to be noted that the conduit or cable clamp may be used separately from the open bridle ring, and that this open bridle ring may be added at any future time by simple manipulation. It will also be noted that in my invention no tapping or screw-threading of the conduit or cable clamp is required, and that it is not necessary or desirable to screw-thread the bridle ring, all of which saves expense in manufacture.

Having thus described this invention in connection with illustrative embodiments thereof, to the details of which I do not desire to be limited, what is claimed as new and what is desired to secure by Letters Patent is set forth in the appended claim.

What I claim is:—

A new article of manufacture comprising an open bridle ring having one of its ends unsupported, its other end being bifurcated and provided with means to coöperate with a conduit or cable clamp.

WILLIAM J. HISS.

Witnesses:
 ANNA M. HEINZ,
 A. M. WILLIAMS.